United States Patent
Allen et al.

(10) Patent No.: US 10,489,473 B2
(45) Date of Patent: Nov. 26, 2019

(54) GENERATING INFORMATION DESCRIBING INTERACTIONS WITH A CONTENT ITEM PRESENTED IN MULTIPLE COLLECTIONS OF CONTENT

(71) Applicant: Flipboard, Inc., Palo Alto, CA (US)

(72) Inventors: Christopher Kennedy Casey Allen, Mountain View, CA (US); Troy Brant, San Francisco, CA (US); Jason Culverhouse, Redwood City, CA (US); Christen Duong, San Francisco, CA (US); Guy Hawkins, San Francisco, CA (US); Douglas Lee, Mountain View, CA (US)

(73) Assignee: Flipboard, Inc., Redwood City, CA (US)

(*) Notice: Subject to any disclaimer, the term of this patent is extended or adjusted under 35 U.S.C. 154(b) by 197 days.

(21) Appl. No.: 15/620,790

(22) Filed: Jun. 12, 2017

(65) Prior Publication Data
US 2018/0357323 A1   Dec. 13, 2018

(51) Int. Cl.
| | | |
|---|---|---|
| *G06F 16/00* | (2019.01) | |
| *G06F 16/9535* | (2019.01) | |
| *G06F 17/24* | (2006.01) | |
| *G06F 16/958* | (2019.01) | |
| *G06F 16/2457* | (2019.01) | |

(52) U.S. Cl.
CPC .... *G06F 16/9535* (2019.01); *G06F 16/24578* (2019.01); *G06F 16/958* (2019.01); *G06F 17/248* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,396,485 | B2* | 7/2016 | Freishtat | G06Q 30/02 |
| 9,594,751 | B1* | 3/2017 | Gill | G06Q 30/0601 |
| 9,824,313 | B2* | 11/2017 | Griesmeyer | G06F 16/00 |
| 2011/0161479 | A1* | 6/2011 | Freishtat | G06Q 30/02 709/223 |
| 2015/0244830 | A1* | 8/2015 | Rietveld | G06F 16/00 715/745 |
| 2016/0275127 | A1* | 9/2016 | Freishtat | G06Q 30/02 |
| 2018/0014038 | A1* | 1/2018 | Lamburt | H04L 47/80 |

* cited by examiner

*Primary Examiner* — Farhan M Syed
(74) *Attorney, Agent, or Firm* — Fenwick & West LLP

(57) ABSTRACT

A digital magazine server receives user interactions with content items presented to users via various digital magazines. The digital magazine server retrieves interactions associated with a content item that are also associated with multiple digital magazines. From the retrieved interactions, the digital magazine server generates information describing global interactions with a content item that are associated with multiple digital magazines. The digital magazine server may filter interactions with the content item that are associated with different digital magazines based on characteristics of the interactions and the information describing global interactions with the content item generated based on the filtered interactions.

12 Claims, 5 Drawing Sheets

GENERATING INFORMATION DESCRIBING INTERACTIONS WITH A CONTENT ITEM PRESENTED IN MULTIPLE COLLECTIONS OF CONTENT

BACKGROUND

This invention generally relates to identifying user interactions with content items in a digital magazine, and more particularly to creating a description of interactions with a content item that aggregates interactions with a content item across multiple digital magazines.

Many online platforms allow a user to view content items, such as news articles and videos. Often, a particular content item is accessible through multiple platforms or online communities. For example, the particular content item is posted on a website, a news aggregator, and a social media site. Many online services also frequently allow users to interact with content items. Example interactions with content items include posting comments and viewing comments from other users. Comments allow users to discuss the content item and see how other users are responding to the content item.

With conventional online services, a user accessing a content item through one online system is limited to viewing other user interactions with the content item that occurred via the same online system. For example, a user accessing a news article posted on a specific website is not able to view comments on the news article posted on other websites to which the news article was posted. Hence, using conventional online systems, a user accessing a content item via a particular online platform seeking to view interactions (e.g., comments) with the content item received by another online platform would need to manually access the other online platform, identify the content item on the other online platform, and view the interactions with the content item. Accordingly, users of traditional online services are unable to readily identify interactions with a content item performed via various online services to which the content item is posted.

SUMMARY

A digital magazine server provides a digital magazine including various content items to a user and allows the user to interact with content items of the digital magazine. For example, the digital magazine server receives comments on various content items from users and allows other users to view the received comments. Additionally, the digital magazine server provides the user with information about interactions with the content item by various other users of the digital magazine server, also referred to as "global interactions" with the content item. Various interactions by other users with the content item may be identified by the digital magazine server. Example interactions with the content item include providing a comment on the content item and sharing the content item with other users. The online system provides information about global interactions with the content item by retrieving the user's interactions with the content item as well as interactions by other users with the content item via the digital magazine server. In various embodiments, the digital magazine server also retrieves interactions with the content item by users via third party systems. For example, the digital magazine server retrieves interactions by users of one or more social networking systems with the content item received by the various social networking systems. The digital magazine server generates information describing the interactions with the content item by various users via the digital magazine server, and may include interactions with the content item by users via one or more third party systems. For example, the digital magazine server generates a comment thread presented with the content item including comments received from various users via the digital magazine server as well via other third party systems. In some embodiments, the digital magazine server modifies the comment thread so comments relevant to the user or received from other users having one or more characteristics matching characteristics of the user. Additionally, the digital magazine server may identify third party systems from which the digital magazine server obtained interactions with a content item in various embodiments.

In some embodiments, the digital magazine server receives a request from the user for information describing global interactions with a content item from a user. For example, the digital magazine server presents the content item to a user via a source magazine and receives the request for information describing the global interactions with the content item. Responsive to receiving the request, the digital magazine server accesses interactions with the content item by various users, with one or more of the interactions associated with an additional digital magazine, different form the source magazine, in which the content item was presented. The one or more interactions with the content item associated with the additional digital magazine are aggregated with interactions with the content item associated with the source digital magazine to generate information describing global interactions with the content item. When aggregating the interactions with the content item associated with the source magazine and with the additional magazine, the digital magazine server may filter the interactions based on one or more criteria. The information describing global interactions with the content item is subsequently presented to the user.

Figure 1:
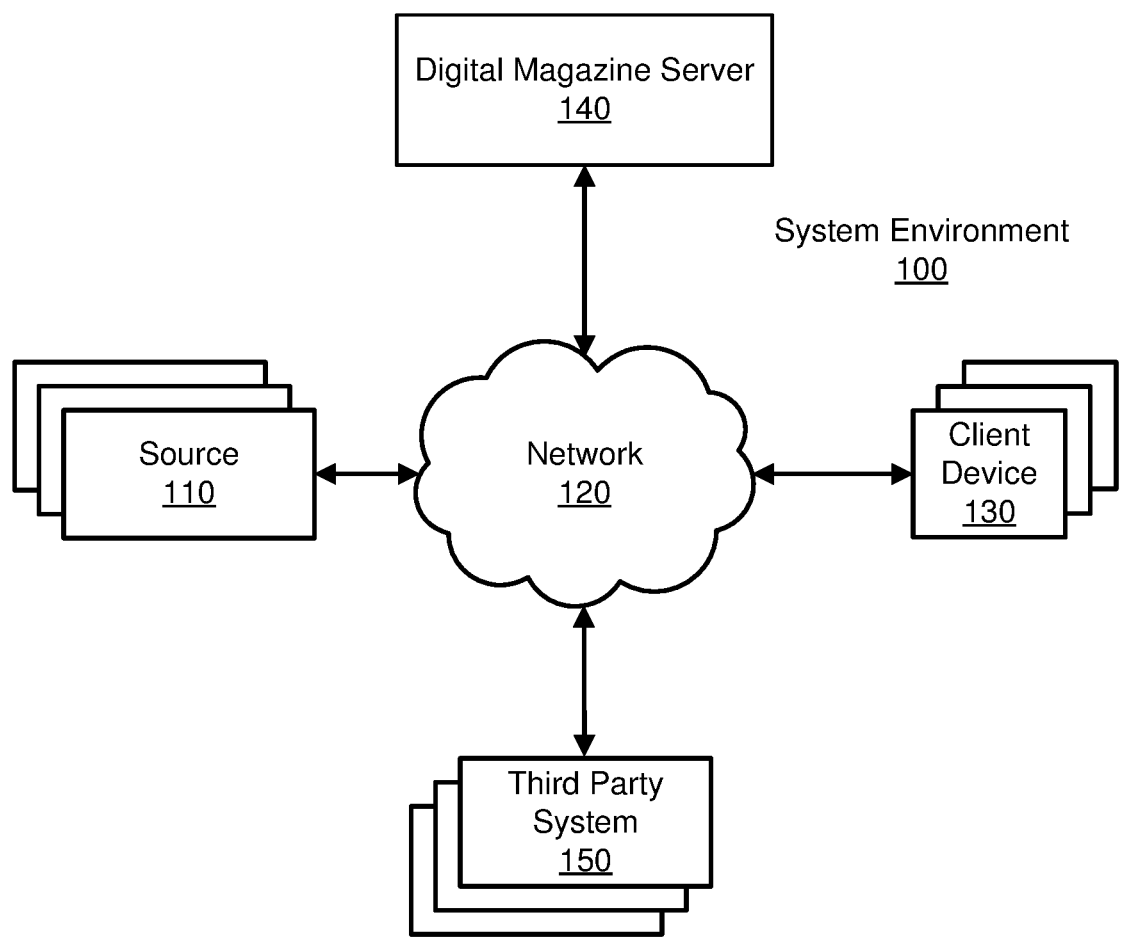
FIG. 1 is a block diagram of a system environment in which a digital magazine server operates, according to one embodiment.

The figures depict a preferred embodiment of the invention for purposes of illustration only. One skilled in the art will readily recognize from the following discussion that alternative embodiments of the structures and methods illustrated herein may be employed without departing from the principles of the invention described.

DETAILED DESCRIPTION

A digital magazine server retrieves content from one or more sources and generates a personalized, customized digital magazine for a user based on the retrieved content. The generated digital magazine is received by a digital magazine application executing on a client device (such as a mobile communication device, tablet, computer, or any other suitable computing system) of the user. The digital magazine application presents the digital magazine to the user and receives actions from the user with content presented via the digital magazine by the digital magazine application. A digital magazine includes digital content items, also referred to as "articles," which may include textual articles, pictures, videos, audio, user-generated content (e.g., content posted on a social networking system), advertisements, and any other types of content capable of display within the context of a digital magazine.

The user of the digital magazine server can interact with content items of the digital magazine via the digital magazine application. Example interactions include: accessing a content item, sharing a content item with another user of the digital magazine server, and providing a comment associated with a content item. Additionally, the digital magazine application executing on the user's client device allows the user to exchange messages with other users. For example, the user replies to comments on a content item provided by other users of the digital magazine server; hence, the digital magazine server may maintain various threads of comments between the user and one or more additional users. The interactions received via the digital magazine application are communicated to the digital magazine server, which uses the received interactions to select threads of comments on various topics likely of interest to the user.

To present users with content items most likely of interest to the users, the digital magazine server indexes content items based on characteristics of the content items. For example, an indexed content item includes information about various content items, such as topic, author, source, creation data/time, user comments information, or other information related to the content items. A topic of a content item can be represented by key terms, phrases associated with the content item, which describe certain characteristics of the content item. Multiple content items may be associated with a common topic or associated with similar topics. Examples topics describe famous people, sports teams, cities, movies, television shows, books, current events, geographical sites, ideologies, academic fields, and technical compilations.

Users of the digital magazine server may post comments on content items. A comment may include a string of text characters. In some embodiments, comments may also include metadata tags, images, videos, or links. From comments associated with a content item, the digital magazine server may create and maintain a thread of comments. In addition to showing the comments and other interactions with a content item for a particular digital magazine including the content item, the digital magazine server may provide the user with information identifying global interactions with the content item that includes interactions with the content item received via other digital magazines including the content item.

FIG. 1 is a block diagram of a system environment 100 for a digital magazine server 140. The system environment 100 shown by FIG. 1 comprises one or more sources 110, a network 120, one or more client devices 130, and the digital magazine server 140. Additionally, the system environment 100 includes one or more third party systems 150. In alternative configurations, different or additional components may be included in the system environment 100. Additionally, the embodiments described herein can be adapted to online systems that are not digital magazine servers 140.

A source 110 is a computing system capable of providing various types of content to a client 130 and the digital magazine server 140. Examples of content provided by a source 110 include text, images, video, or audio on web pages, web feeds, social networking information, messages, or other suitable data. Additional examples of content include user-generated content such as blogs, shared images, video or audio, social networking posts, and social networking status updates. Content provided by a source 110 may be received from a publisher (e.g., stories about news events, product information, entertainment, or educational material) and distributed by the source 110, or a source 110 may publish content generated by the source. For purposes of illustration, content from a source 110, regardless of its composition, may be referred to herein as a "content item," or as "content." Hence, a content item may include text, images, video, audio, interactive media, links, or any other suitable content.

The sources 110 communicate with one or more client devices 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.1, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

A client device 130 is a computing device capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone, a smartwatch, or another suitable device. In one embodiment, the client device 130 executes an application enabling a user of the client device 130 to interact with the digital magazine server 140. For example, an application executing on the client device 130 communicates instructions or requests for a personalized feed of content items to the digital magazine server 140. In one embodiment, the client device 130 sends the instructions or requests upon initial execution (e.g., opening) of the application. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130, in various embodiments, any number of client devices 130 may communicate with the digital magazine server 140. Different client devices 130 may have different characteristics such as different processing capabilities, different connection speeds with the digital magazine server 140 over the network 120, and different device types (e.g., make, manufacture, and version).

In various embodiments, a client device 130 is configured to present information to and receive information from a user of the client device 130. For example, the client device 130 may include a display device, or other user interface, for presenting content (such as content items of the digital magazine server 140) to the user. Additionally, the client device 130 receives input from a user via a user interface. Inputs received via a user interface of the client device 130 may be processed by a digital magazine application associated with the digital magazine server 140 and executed on the client device 130 to allow a user of the client device 130 to interact with content items presented by the digital magazine server 140. As an example, an input provided by a user of the client device 130 may indicate the user's interest in a particular topic or subtopic. More specifically, a user of the client device 130 may provide a selection of topics and/or subtopics of interest to the user via the user interface. The client device 130 provides information about topics or subtopics of interest to the digital magazine server 140 for creation of a digital magazine for presentation to the user. The client device 130 may also allow a user to interact with an individual content item presented via the client device 130. Example interactions with a content item include: viewing the content item, posting a comment associated with the content item, sharing the content item with other users of the digital magazine server 140, sharing the content item with other users of a third party system 150, or including the content item in a digital magazine curated by the user and maintained by the digital magazine server 140.

The digital magazine server 140, which is further described below in conjunction with FIG. 2, receives content items from one or more sources 110 and generates personalized content feeds for users of the digital magazine server 140 by processing the received content. The digital magazine server 140 provides a personalized content feed to a client 130 device so a user of the digital magazine server 140 may access content items in the personalized content feed via the client device 130. Multiple content items may be aggregated into a digital magazine, and a user may access a content item by browsing the digital magazine. Digital magazines may be generated by a user and stored on the digital magazine server 140 or automatically generated by the digital magazine server 140.

For a particular user, the digital magazine server 140 may determine a topic of interest for the user and obtain a feed of content items related to the topic of interest from one or more sources 110. In various embodiments, the content items obtained from the sources 110 are not filtered based on selections of topics or subtopics by the user or otherwise modified based on characteristics of the user. The digital magazine server 140 identifies subtopics of the topic of interest and identifies subtopics likely to be of interest to the user based on information about the user. In various embodiments, each content item is associated with a topic, and each topic may have one or more related subtopics. For example, a topic on sailing may have a subtopic on Caribbean sailing and another subtopic on different types of yachts for sailing. In various embodiments, a subtopic is more specific than a topic and provides an additional level of granularity in identifying a user's interests. Multiple content items may share or relate to a topic or a subtopic.

The digital magazine server 140 identifies content items in feed of content that are related to the identified subtopics likely of interest to the user and biases presentation of content from the feed to the user towards presentation of the content items related to the identified subtopics instead of content items in the feed of content that are not related to the identified subtopics. This allows the digital magazine server 140 to generate a personalized feed of content for the user that includes content items selected based on topics and subtopics likely of interest to the user. Accounting for subtopics of interest to the user when generating the personalized feed of content increases a likelihood of the user interacting with the personalized feed of content, which is then boosted according to the interests of a user and provide the personalized feed of content to a user of the digital magazine server 140.

One or more third party systems 150 may be coupled to the network 120 for communicating with the digital magazine server 140 or one or more client devices 130. In one embodiment, a third party system 150 is an application provider communicating information describing applications for execution by a client device 130 or communicating data to client devices 130 for use by an application executing on the client device 130. In other embodiments, a third party system 150 provides content or other information for presentation via a client device 130. A third party system 150 may also communicate information to the digital magazine server 140, such as advertisements, content, or information about an application provided by the third party system 150. For example, a third party system 150 is a social networking system maintaining connections between various users and presenting content items to the various users.

Figure 2:
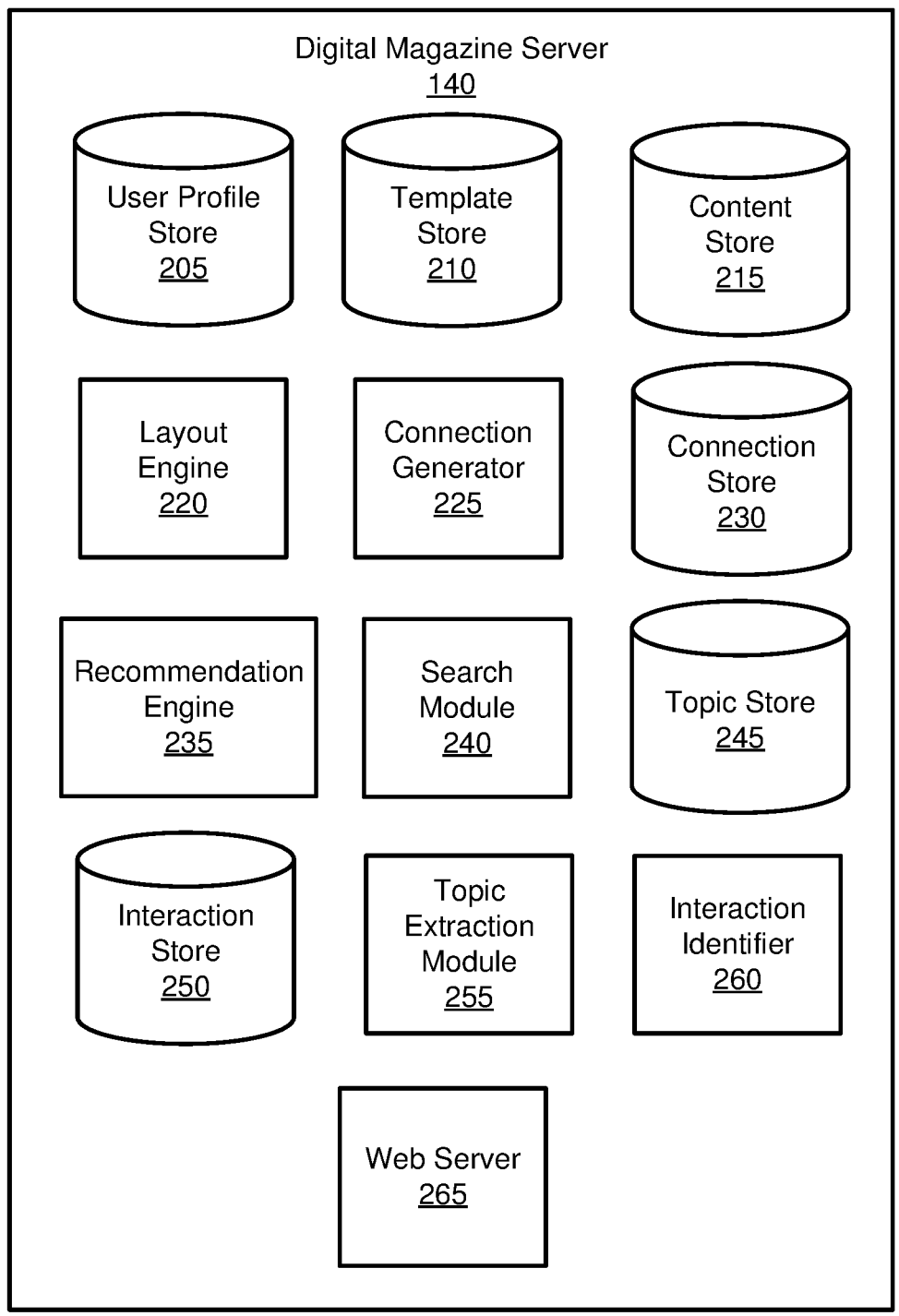
FIG. 2 illustrates a digital magazine server, according to one embodiment.

FIG. 2 is one embodiment of a digital magazine server 140. In the embodiment shown by FIG. 2, the digital magazine server 140 includes a user profile store 205, a template store 210, a content store 215, a layout engine 220, a connection generator 225, a connection store 230, a recommendation engine 235, a search module 240, a topic store 245, an interaction store 250, a topic extraction module 255, an interaction identifier 260, and a web server 265. In other embodiments, the digital magazine server 140 may include additional, fewer, or different components for various applications.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140.

For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, and U.S. patent application Ser. No. 13/938,227, filed on Jul. 9, 2013, each of which is hereby incorporated by reference in its entirety.

The content store 215 stores objects that each represent various types of content. For example, the content store 215 stores content items received from one or more sources 110 within a threshold time of a current time. Examples of content items stored by the content store 215 include: a page post, a status update, an image, a photograph, a video, a link, an article, video data, audio data, a check-in event at a location, or any other type of content. A user may specify a section including content items having a common characteristic, and the common characteristic is stored in the content store 215 along with an association with the user profile or the user specifying the section.

Additionally, the content store 215 includes a plurality of digital magazines that each include one or more content items. A digital magazine may be created and curated by one or more users of the digital magazine server 140. For example, a user selects content items and identifies a digital magazine to associate with the selected content items. A user may select content items and identify a digital magazine to associate with the content items via an interface presented to the user by a client device 130. In some embodiments, the digital magazine server 140 automatically associates content items pertaining to one or more topics with a digital magazine to generate a digital magazine that is stored in the content store 215. In some embodiments, digital magazines stored in the content store 215 are associated with topics identified from the topic store 245, which is further described below. Topics associated with a digital magazine may be specified by a user who curates the digital magazine or may be associated with the digital magazine by the digital magazine server 140 based on characteristics of content items included in the digital magazine server 140.

Figure 3:
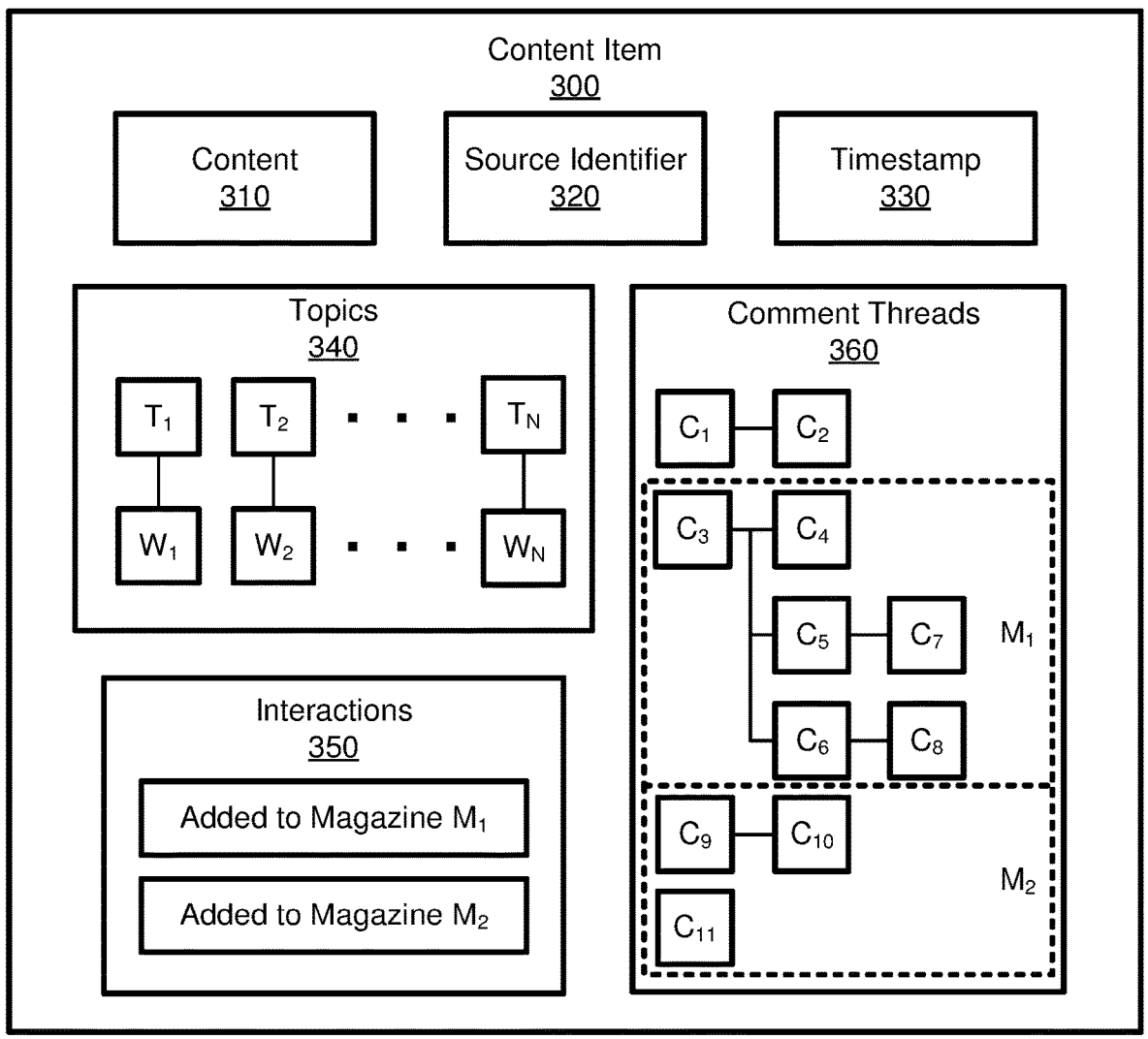
FIG. 3 illustrates an example of a content item of a digital magazine system, according to one embodiment.

FIG. 3 shows an example content item 300. In the example of FIG. 3, the content item 300 includes content 310, a source identifier 320, a timestamp 330, one or more topics 340, one or more interactions 350, and one or more comment threads 360. However, the content item 300 may include additional or different components from those shown in FIG. 3 in other embodiments.

The content 310 is data for presentation to a user. Example content includes images, media, text, audio data, video data, or a combination of thereof. In some embodiments, the content 310 comprises a network address identifying a location from which content is retrieved and presented when a user views the content item 300. The source identifier 320 is information identifying a source 110 from which the content item 300 was obtained. For example, the source identifier 320 identifies a user from whom the content was obtained. The timestamp 330 indicates a time (e.g., calendar date, hour, minute, and second) the content item 300 was received from a source 110 or a time when the content item 300 was originally published. In some embodiments, the timestamp 330 also stores times when the content 310 was edited (e.g., a correction to a news article issued by the content source). Additionally, the timestamp 330 may identify times when different comments were posted to the content item 300.

Additionally, the content item 300 is associated with one or more topics 340. For example, the content item 300 is associated with a set of topics $\{T_1 \ldots T_N\}$, which are each associated with a corresponding weight $\{W_1 \ldots W_N\}$. In one embodiment, the topics 340 of the content item 300 are determined by the topic extraction module 255, which is further described below in conjunction with FIG. 2. The topic extraction module 255 may associate each topic 340 with a weight in various embodiments. A weight $W_i$ associated with a topic $T_i$ corresponds to degree to which the content item 300 relates to the topic $T_i$, or an estimated likelihood that the content item 300 relates to the topic $T_i$.

Additionally, the content item 300 includes one or more interactions 350, which are also stored in the interaction store 250 or identified in the interaction store 250, which is further described below in conjunction with FIG. 2. In the example of FIG. 3, the content item 300 includes interactions 350 of being added to magazines $M_1$ and $M_2$. Users curating the magazines $M_1$ and $M_2$ added the content item to the magazines. Comments posted to the content item 300 by users are also included in the content item 300. In the example of FIG. 3, comments posted to the content item 300 are organized into one or more comment threads 360. Each comment threads 360 may be organized according to a hierarchical tree structure. For example, the content item 300 shown in FIG. 3 has eleven comments: $C_1 \ldots C_{11}$. Comments $C_1$ $C_3$, $C_9$, and $C_{11}$ are not replies to any other comments, so they are identified herein as "root comments." A comment that is a reply to an additional comment is denoted herein as a "child" of the additional comment; a child comment may have one or more other child comments and collectively referred to as the "descendants" of a root comment. For example, comment $C_2$ is a child of comment $C_1$ and comments $C_4 \ldots C_8$ are descendants of comment $C_3$. In some embodiments, the digital magazine server 140 does not allow replies to comments, so all comments are root comments. The hierarchical structure of comments may be determined based on explicit input from users (e.g., pressing a reply button associated with another user's comment and subsequently entering a comment) or based on implicit relationships between comments. For example, a comment $C_a$ is determined to be a reply of a comment $C_b$ if $C_a$ includes a metadata tag associated with the username of the user who posted $C_b$ or if $C_b$ includes a portion of text matching at least a threshold portion of text included in $C_a$. If a comment does not have one or more child comments is stored in association with the content item 300 as a comment thread 360 including the single comment in various embodiments.

Each comment thread 360 is associated with a topic in various embodiments. Different comment threads 360 may be associated with different topics. For example, for the content item 300 illustrated in FIG. 3, the comment threads 360 include: the comment thread of comments $\{C_1, C_2\}$, the comment thread of comments $\{C_3, C_4\}$, the comment thread of comments $\{C_3, C_5, C_7\}$, the comment thread of comments $\{C_3, C_6, C_8\}$, and the comment thread of comments $\{C_3, C_4, C_5, C_7, C_6, C_8\}$, etc. Each of the comment threads of the content item 300 can be related to same, similar or different topics. Determining a topic of a comment thread of a content item is further described below with reference to FIG. 2.

Comments or comment threads may be associated with particular magazines. For example, the comment thread $\{C_3, C_4, C_5, C_7, C_6, C_8\}$ is associated with the magazine $M_1$ and the comment threads $\{C_9, C_{10}\}$ and $\{C_{11}\}$ are associated with the magazine $M_2$. Conversely, comments $C_1$ and $C_2$ are not associated with any magazine. Comments may be associated with a magazine when a user accesses the content item through the magazine (e.g., by viewing the magazine's feed or when the content item is added to the user's feed because the user is subscribed to the magazine). In some embodiments, users can provide feedback to a comment. For example users may indicate a preference for a comment or indicate dislike for a comment. A number of indications of preference and indications of dislikes received from users may be associated with a comment. Additionally, a user may provide a complaint for a comment that indicates the comments violates one or more policies enforced by the digital magazine server 140 (e.g., the comment is obscene, contains hate speech, or is spam).

In some embodiments, the content item 300 may also include a title and a thumbnail image. For example, a title is a headline of an article, the title of a written work, or the title of a video. The thumbnail may be a smaller version of an image included in the content item 300 or a frame of a video included in the content item 300 or an image in a gallery of images. The titles and thumbnails of multiple content items may be presented to a user, allowing the user to select a content item for presentation by selecting a thumbnail or a title of the content item.

Referring back to FIG. 2, the layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. Examples of using a page template to present content items are further described in U.S. patent application Ser. No. 13/187,840, filed on Jul. 21, 2011, U.S. patent application Ser. No. 13/938,223, filed on Jul. 9, 2013, and U.S. patent application Ser. No. 13/938,226, filed on Jul. 9, 2013, each of which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a user and an additional user by analyzing the user's interactions with content items posted by the additional user, whether the content items are presented using the digital magazine server 140 or using another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 240 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 240 may present identified content items based on a ranking. One or more factors associated with the content items may be used to generate the ranking. Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

The topic store 245 stores information identifying different topics, which may be predetermined or generated from various data sources (e.g., webpages and publically available social networking sources) by the digital magazine server 140. A content item of a digital magazine can be related to one or more particular topics. A topic of a content item may be represented by key terms or phrases associated with the content item describing certain characteristics of the content item, such as famous people, sports teams, cities, movies, television shows, books, current events, geographical sites, ideologies, academic fields, etc. Multiple content items may be associated with a common topic or associated with similar topics. Example embodiments of generating topics from various data sources and differentiating topics are described in the U.S. patent application Ser. No. 12/896,700, filed Oct. 1, 2010, which is hereby incorporated by reference herein in its entirety.

The interaction store 250 stores information describing interactions by users of the digital magazine server 140 with content items presented to the users by the digital magazine server 140. Example interactions include comments on content items presents to users and replies to the comments from users of the digital magazine server 140. Comments associated with a content item may be grouped into a comment thread by the digital magazine server 140 that is stored as a thread in the interaction store 250 that is also associated with the content item for which the comments were received. In one embodiment, comments of a thread are stored in a hierarchical structure, such as a tree where each comment is a node of the tree. A comment that is a reply to another comment is linked to the other comment in the hierarchical structure. Interactions may also include viewing a content item, sharing the content item with other users of the digital magazine server 140, sharing the content item with other users of third party system 150, indicating a preference or other reaction to the content item, and adding the content item to magazine curated by the user. Each interaction is associated with a content item, and may also be associated with a particular magazine, such as a magazine including or associated with the content item. The interaction store 250 may also identify a user profile of a user who performed an interaction and the time that the action was performed.

The topic extraction module 255 analyzes a content item or a comment posted to a content item to identify one or more topics from the topic store 245 associated with the content item or the comment. In one embodiment, the topic extraction module 255 parses the text of a content item or a comment based on the words in the text of the content item of the comment and semantic relationships between the words. For example, the topic extraction module 255 parses the text into semantic tokens. A semantic token may be a word, phrase, or other combinations of words. The topic extraction module 255 determines the syntactic relationships between the semantic tokens representing different portions (e.g., sentences) of the text of the content item or of the comment. As an example, the topic extraction module 255 parses the sentence "Berkeley argued for immaterialism" parsed into a tuple containing semantic tokens corresponding to the noun "Berkeley", the verb "to argue", the preposition "for", and the noun "Immaterialism" based on semantic relationships between the tokens, the topic extraction module 255 identifies the noun "Berkeley" as the subject of the sentence and identifies the preposition "for" and the noun "Immaterialism" as a prepositional phrase that acts as an adverbial clause.

The topic extraction module 255 maps one or more semantic tokens extracted from a content item or from a comment to topics selected from the catalog of topics stored in the topic store 245. Some semantic tokens may correspond to a specific topic, while other semantic tokens may correspond to multiple topics, and the topic extraction module 255 maps a semantic token corresponding to multiple topics to a particular topic based on a context in which the semantic token is used in a content item or in a comment. For a semantic token corresponding to multiple topics, the topic extraction module 255 determines a set of candidate topics to which the semantic token may correspond and selects a topic from the set of candidate topics based on context in each possible topic is used.

In one embodiment, the context for a topic is represented by a context value map. A context value map for a topic comprises a mapping between a set of semantic tokens and a set of confidence values. For example, if a topic T has a context value map in which a semantic token S mapped to a confidence value V, the value V indicates the quality of co-occurrences of the topic T and the semantic token S. The confidence value V may be an estimate of a likelihood (e g., a Bayesian likelihood) that a content item or a comment relates to the topic T given that the content item or the comment includes the semantic token S. Alternately, the confidence value V is an estimate of a likelihood that the semantic token S and the topic T both occur in a content item or in comment if either the semantic token S or the topic T occurs in the content item or comment. The context value map may be derived a posteriori by analyzing the co-occurrence of semantic tokens and topics as well as syntactical relationships between a topic and semantic tokens in data such as web pages, online encyclopedias, books, user-generated comments, and content items collected by the digital magazine server 140. For simplicity, each topic is described herein as having a single context value map. However, in some embodiments, each topic may have a content context value map for content items on the topic and a comment context value map for comments on the topic.

Hence, the topic extraction module 255 determines a topic associated with a semantic token based on the context value map of each of the possible topics corresponding to the semantic token the semantic tokens parsed from the surrounding text. The topic extraction module 255 determines a score for each topic corresponding to the semantic token and selects the topic having a maximum score. For example, the topic extraction module 255 determines the topic associated with the semantic token is a topic corresponding to the semantic token having a maximum score.

After converting each portion (e.g., each sentence) of text of a content item or a comment is converted into a tuple of semantic tokens and a topic associated with various semantic tokens, the topic extraction module 255 determines a set of related topics $\{T_1, \ldots T_N\}$ for the content item or the comment and a set of weights $\{W_1, \ldots W_N\}$ each associated with a topic. The weight (e.g., $W_i$) associated with a topic (e.g., $T_i$) represents an estimate of a degree to which the content item or the comment relates to the topic. The topic extraction module 255 selects one or more related topics $\{T_1 \ldots T_N\}$ from among the set of all topics $\{T_1 \ldots T_K\}$ identified for the content item or for the comment, which may include topics not explicitly occurring in the content item or the comment. In some embodiments, the topic extraction module 255 computes a score for each topic $T_k$ ($1 \leq k \leq K$) identified for the content item, with a score $S_k$ for a topic based on the number of occurrences of the topic $T_k$ or occurrences of topics and semantic tokens related to topic $T_k$ in the content item or in the comment. The topic extraction module 255 selects the related topics $\{T_1 \ldots T_N\}$ as as topics $\{T_1 \ldots T_K\}$ identified for the content item with scores higher than a threshold value. The weights $\{W_1 \ldots W_N\}$ of each topic may be based on the scores of the respective topics.

In some embodiments, when determining a topic for one or more comments, the topic extraction module 255 selects a set of candidate topics from topics identified for one or more comments and compares the set of candidate topics for the one or more comments with the set of topics of the content item associated with the one or more comments. Based on the comparison, the topic extraction module 255 selects a topic for the one or more comments that is same or similar to the topic of the content item associated with the one or more comments. In some embodiments, the topic extraction module 255 associates multiple topics with the one or more comments based on the comparison. In one embodiment, the topic extraction module 255 determines a relevance score between each pair of a candidate topic for the one or more comments and a topic associated with the content item. Based on the relevance scores of the candidate topics for the one or more comments, the topic extraction module 255 selects one or more candidate topics to associate with the one or more comments. For example, the topic extraction module 255 ranks the one or more candidate topics based on the relevance scores, and selects candidate topics having a threshold position in the ranking. Multiple comments or threads of comments may be combined into a composite thread of comments that includes at least a set of the comments associated with individual comments in the composite thread. For example, comment thread and comments associated with a common topic or with related topics may be combined into a composite thread of comments.

The interaction identifier 260 information describing interactions with a content item and presents the information describing the interactions with the content item. In various embodiments, the interactions with the content item may be associated with a particular digital magazine including the content item. If a content item is included in multiple digital magazines, interactions with the content item are associated with the content item and a particular digital magazine in which the content item was presented when the interactions were received. As used herein, information describing interactions with a content item and associated with multiple digital magazines is referred to as information describing "global interactions" with the content item. The interaction identifier 260 generates information describing interactions with the content item associated with multiple digital magazines in which the content item was presented. In some embodiments, the interaction identifier 260 generates information describing global interaction with a content item in response to receiving a request from a user accessing the content item through a digital magazine presenting the content item. The digital magazine through which the user accesses the content item is referred to herein as a "source digital magazine."

Figure 4:
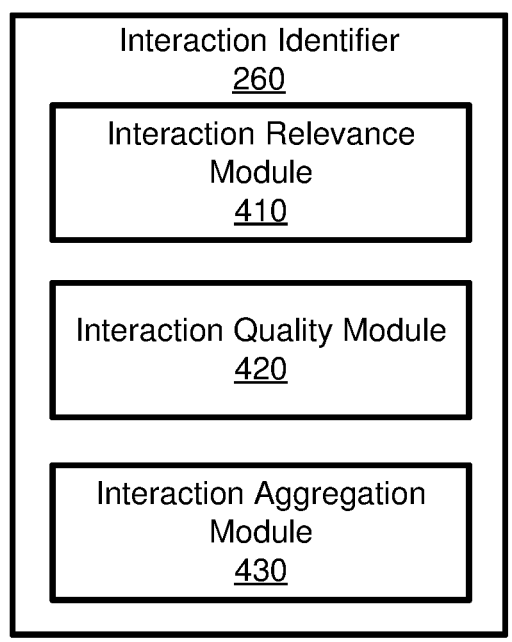
FIG. 4 is an example of a global interaction module, according to one embodiment.

FIG. 4 shows an embodiment of the interaction identifier 260 according to one embodiment. The global interaction identifier 260 includes an interaction relevance module 410, an interaction quality module 420, and an interaction aggregation module 430. However, in other embodiments, the interaction identifier 260 includes different or additional components than those shown in conjunction with FIG. 4.

The interaction relevance module 410 compares the relevance of interactions from the interaction store 250 to the user requesting information describing global interaction with the content item. The interaction relevance module 410 assesses the relevance to the user of interactions with the content item associated with multiple digital magazines, rather than only interactions with the content item that are associated with the source digital magazine through which the user accessed the content item. In various embodiments, the interaction relevance module 410 determines a relevance of an interaction to the user by comparing one or more topics associated with the interaction to one or more target topics. A target topic is a topic associated with the source magazine or a topic in which the user has indicated interest. A topic associated with an interaction is a topic associated with a digital magazine with which the interaction was associated or is a topic determined by the topic extraction module 255 from the interaction. For example, the interaction relevance module 410 determines the relevance of a comment to a user by comparing a topic associated with the comment by the topic extraction module 255 to one or more target topics associated with the source digital magazine.

In various embodiments, the interaction relevance module 410 determines a relevance score of each interaction and each comment or thread of comments to the user. The relevance of an interaction, such as a comment, to the user is based on a measure of similarity between a vector of semantic tokens of a topic of the interaction and a vector of semantic tokens of a target topic. Example measures of similarity include a cosine similarity between the vector of semantic tokens of the topic of the interaction and the vector of semantic tokens of the target topic or the generalized Euclidean distance between the vector of semantic tokens of the topic of the interaction and the vector of semantic tokens of the target topic. Based on the relevance scores associated with the interactions, such as comments or threads of comments, the interaction relevance module 410 ranks the interactions in a descending order according to the relevance scores.

The interaction quality module 420 may determine a quality of each interaction, such as each comment, based on the characteristics of the interaction. Examples characteristics of an interaction include a number of comments in a thread of comments, timestamps of the interaction, a source of the interaction, a length of a comment, appropriateness of a comment (e.g., the existence or absence of slurs or mature language), and connections between the user requesting the information describing global interaction with a content item and a user associated with an interaction. In one embodiment, the interaction quality module 420 determines a quality score for a thread of comments by evaluating the characteristics of individual comments within the thread; alternatively or additionally, the interaction quality module 420 determines a quality score for a thread of comments by evaluating characteristics of the thread of comments as a whole. For example, a thread of comments including a large number of comments received nearer to a time when the user requested information describing global interaction with the content item is determined to have a higher quality score than another thread of comments including a greater number of comments received at times farther from the time when the user requested information describing global interaction with the content item. As another example, a quality score of a thread of comments is directly related to a number of comments in the thread, so a thread of comments having a larger number of comments has a higher quality score than a thread of comments having a fewer number of comments.

In another example, a thread of comments having less inappropriate content relative to policies enforced by the digital magazine server 140 (e.g., less profanity, slurs, misspellings, and syntactic errors) in comments has a larger quality score than another comment thread having a greater amount of inappropriate content relative to policies enforced by the digital magazine serve 140. The quality score of a thread of comments may be further evaluated based on the number of indications of preference or indications of dislike received for comments in the thread. For a thread of comments, the interaction quality module 420 determines a quality score by combining characteristics of the thread of comments, where different characteristics of the thread of comments may be differently weighted. Similarly, the interaction quality score may determine a quality score for an interaction by combining characteristics of the interaction; in various embodiments, the interaction quality module 420 associates weights with each characteristic of the interaction when determining the quality score for the interaction. Based on the quality scores of the interactions, the interaction quality module 420 may rank the interactions.

The interaction aggregation module 430 aggregates interactions associated with the content item and associated with multiple digital magazines to generate information describing global interactions with the content item. In one embodiment, the interaction aggregation module 430 aggregates the interactions based on relevance scores associated with the interactions. For example, the interaction aggregation module 430 selects an interaction for inclusion in the information describing global interactions with the content item if the relevance score of the interaction equals or exceeds a threshold value. For example, the interaction aggregation module 430 includes a thread of comments as a subthread of a topic in response to the relevance score associated with the thread of comments equals or exceeds the threshold. Similarly, the interaction aggregation module 430 compare quality scores associated with various interactions to a threshold quality score and includes interactions having quality scores equaling or exceeding the threshold quality score in the information describing global interactions with the content item. Accounting for relevance scores or quality scores of interactions allows the interaction aggregation module 430 to remove low quality, irrelevant, or otherwise uninteresting interactions; hence, the remaining interactions included in the information describing global interactions with the content item are high quality, relevant to the source magazine, or relevant to the user requesting the information describing global interaction with the content item. In some embodiments, the interaction aggregation module 430 combines the relevance score and quality score for each interaction to generate a score for each interaction and selects interactions for the information describing global interactions with the content item based on the score (e.g., ranks interactions based on the scores and selects interactions having at least a threshold position in the ranking, selects interactions having at least a threshold scores). The quality score and relevance score may be combined in any suitable method to generate the score for a content item; for example, a normalized relevance score and a normalized quality score for an interaction are added together to generate the score for the interaction.

In various embodiments, the interaction aggregation module 430 determines an order in which the interactions are presented to the user who requested information describing global interactions with the content item. The interaction aggregation module 430 may order the interactions based on relevance scores, quality scores, or scores derived from a combination of the relevance scores and quality scores. In some embodiments, the interaction aggregation module 430 ranks interactions based on relevance scores, quality scores, or scores derived from a combination of the relevance scores and quality scores and presents the interactions in an order based on the ranking. In other embodiments, the interaction aggregation module 430 orders the interactions based on timestamps associated with the interactions; for example, interactions associated with more recent timestamps are presented to the user before interactions associated with older timestamps. The interactions may be grouped based on topics associated with various interactions, digital magazines associated with various interactions, types of interactions, or any other suitable criteria in some embodiments. For example, the interactions associated with a particular digital magazine are grouped together in an order determined by the interaction aggregation module 430. In some embodiments, the interactions are sorted by magazine and interactions associated with the source digital magazine are visually distinguished from interactions associated with other digital magazines (e.g., interactions associated with the source digital magazine are presented to the user before interactions associated with other digital magazines).

In some embodiments, interactions associated with the source digital magazine are presented to the user, while interactions associated with other digital magazines are initially hidden from the user. When a particular user interaction is received, the interactions associated with the other digital magazines are presented to the user. For example, an interface element is presented by the client device 130 to the user, and when the user accesses the interface element, interactions associated with other digital magazines are retrieved from the digital magazine server 140 and presented to the user.

To further improve the efficiency of aggregation, the interaction aggregation module 430 may process the interactions before aggregating the interactions. For example, the interaction aggregation module 430 combines interactions associated with a common topic into a composite interaction. As an example, the interaction aggregation module 430 combines multiple comments having a common topic into a single composite comment and determines a quality score or relevance score for the composite comment.

The web server 265 links the digital magazine server 140 via the network 120 to the one or more client devices 130, as well as to the one or more sources 110. The web server 265 serves web pages, as well as other content, such as JAVA®, FLASH®, XML and so forth. The web server 265 may retrieve content item from one or more sources 110. Additionally, the web server 265 communicates instructions for generating pages of content items from the layout engine 220 and to a client device 130 for presentation to a user. The web server 265 also receives requests for content or other information from a client device 130 and communicates the request or information to components of the digital magazine server 140 to perform corresponding actions. Additionally, the web server 265 may provide application programming interface (API) functionality to send data directly to native client device operating systems, such as IOS®, ANDROID™, or BlackberryOS.

Figure 5:
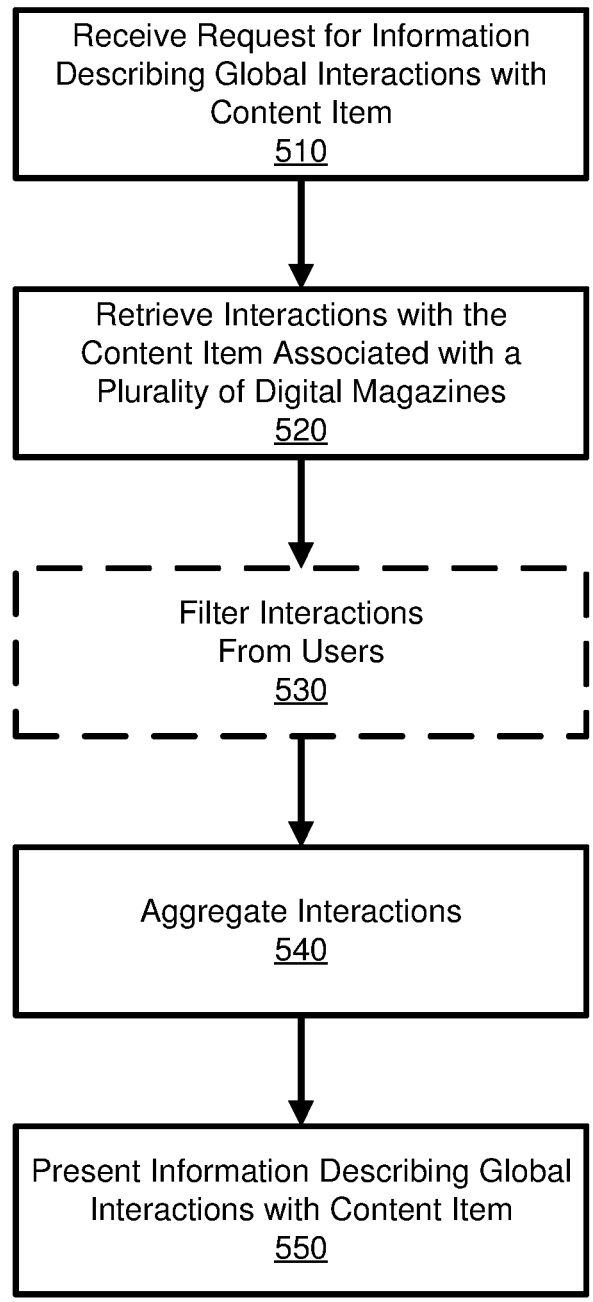
FIG. 5 is a flowchart of a process for generating information describing global interactions with a content item presented by a digital magazine server, according to one embodiment.

FIG. 5 is a flowchart of one embodiment of a process for generating information describing global interactions with a content item maintained by the digital magazine server 140. The digital magazine server 140 receives 510 a request for information describing global interactions with a content item associated with a source digital magazine. The content item is presented to the user via a source digital magazine provided to the user by the digital magazine server 140. In some embodiments, the request is sent to the digital magazine server 140 from a client device 130 presenting the content item when the user views the content item via the client device 130. Alternatively, the request is sent from the client device 130 to the digital magazine server 140 when the user performs a specific interaction (e.g., a user interface button to view comments) with the content item via the client device 130.

In response to receiving 510 the request for information describing global interactions with the content the digital magazine server 140 retrieves 520 interactions with the content item that are associated with multiple digital magazines maintained by the digital magazine server. Hence, the digital magazine server 140 retrieves 520 interactions with the content item associated with at least one digital magazine differing from the source digital magazine, as well as interactions with the content item associated with the source digital magazine. In some embodiments, the digital magazine server 140 identifies the content item associated with the received requests to one or more third party systems 150, which are external to the digital magazine server 140, and obtains information describing interactions with the content item received by users of the one or more third party systems 150.

In various embodiments, the digital magazine server 140 communicates information identifying the content item to one or more third party systems 150 that exchange information with the digital magazine server 140. A third party system 150 compares the information identifying the content item to content items presented by the third party system 150 and retrieves information describing interactions with a content item presented by the third party system 150 including information matching the information identifying the content item. The third party system 150 communicates summary information identifying a number of different types of interactions with the content item presented by the third party system 150 along with an identifier of the third party system 150 to the digital magazine server 150. Alternatively, the digital magazine server 140 communicates information identifying the content item to a source 110 from which the content item was received. The source 110 retrieves information received from one or more third party systems 150 describing interactions with the content item received by various third party systems 150 and identified to the source 110. The source 110 provides information describing interactions received by one or more third party systems 150 with the content item along with information identifying a third party system 150 which received the interactions.

In some embodiments, the digital magazine server 140 filters 730 interactions associated with the digital magazines. As further described above in conjunction with FIGS. 2 and 4, the digital magazine server 140 determines a relevance score, a quality score, or a score based on the relevance score and the quality score for each retrieved interaction and filters 530 the interactions based on the relevance scores, the quality scores, or the scores based on the relevance score and the quality score. Alternatively, the digital magazine server 140 filters 530 the retrieved interactions based on times when the interactions occurred. For example, interactions associated with timestamps within a specific time interval are identified by filtering 530 the retrieved interactions. In other embodiments, the digital magazine server 140 does not filter 530 the retrieved interactions.

The digital magazine server 140 aggregates 540 the retrieved interactions by determining an order in which the retrieved interactions are presented to the user. As described above in conjunction with FIG. 4, the retrieved interactions may be ordered based on associated relevance scores, quality scores, or scores based on the relevance scores and the quality scores. In other embodiments, the retrieved interactions are ordered based on timestamps associated with the retrieved interactions. If the digital magazine server 140 obtained information from a third party system 150 describing interactions with the content item received by the third party system 150, the digital magazine server 140 may aggregate the retrieved interactions so interactions retrieved 520 from the digital magazine server 140 are presented before information describing interactions with the content item received by various third party systems 150. Additionally, the digital magazine server 140 may aggregate 540 the retrieved information so information describing interactions with the content item received by different third party systems 150 is ordered based on the third party system 150 from which the information describing interactions with the content item was received. The aggregated information describing global interactions with the content item is presented 550 to the user. For example, the digital magazine server 140 communicates the aggregated information describing global interactions with the content item to a client device 130, which presents the information describing global interactions with the content item to the user.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method comprising:
    maintaining multiple digital magazines at a digital magazine server, each digital magazine including one or more content items for presentation;
    maintaining, at the digital magazine server, comments associated with each of at least a set of the digital magazines, comments associated with content items presented by the digital magazine server to users, a comment associated with a content item and associated with with a digital magazine in which the content item was presented when the comment was received;
    receiving, from a user, a request for information describing comments associated with a specific content item accessed through a source digital magazine presented to the user via the digital magazine server;
    retrieving a plurality of comments associated with the specific content item from the maintained interactions, one or more of the plurality of comments associated with an additional digital magazine different than the source digital magazine;
    aggregating the retrieved plurality of comments based on characteristics of each of the retrieved plurality of comments to generate information describing global comments associated with the specific content item including comments associated with the source digital magazine and at least one comment associated with at least one additional digital magazine different than the source digital magazine; and
    providing the information describing the global comments associated with the specific content item to a client device for presentation to the user.

2. The method of claim 1, wherein aggregating the retrieved plurality of comments based on characteristics of each of the retrieved plurality of comments comprises:
    filtering the plurality of comments to obtain a set of interactions satisfying one or more criteria; and
    aggregating the set of comments to generate the information describing the global comments associated with the specific content item.

3. The method of claim 2, wherein filtering the plurality of comments to obtain a set of interactions satisfying one or more criteria comprises:
    determining a relevance score for each of the plurality of comments, a relevance score for a comment of the plurality based on a comparison of one or more topics associated with the comment and one or more topics associated with the user; and
    filtering the plurality of comments to obtain a set of comments having at least a threshold relevance score.

4. The method of claim 2, wherein filtering the plurality of comments to obtain a set of comments satisfying one or more criteria comprises:
    determining a quality score for each of the plurality of comments, a quality score for a comment of the plurality based on one or more characteristics of the comment of the plurality; and
    filtering the plurality of comments to obtain a set of comments having at least a threshold quality score.

5. The method of claim 4, wherein a characteristic of the comment of the plurality is selected form a group consisting of: a number of comments in a comment thread including the comment of the plurality, a timestamp of the comment of the plurality, a source of the comment of the plurality, a length of the comment of the plurality, a presence of inappropriate content in the comment of the plurality, a connection between a user associated with the comment of the plurality and the user, and any combination thereof.

6. The method of claim 1, wherein aggregating the retrieved plurality of comments based on characteristics of each of the retrieved plurality of comments to generate information describing global comments associated with the specific content item comprises:
    organizing the retrieved plurality of comments to present comments associated with the source digital magazine before comments associated with one or more additional digital magazines differing from the source digital magazine.

7. A computer program product comprising non-transitory computer-readable storage medium having instructions encoded thereon that, when executed by a processor, cause the processor to:
    maintain multiple digital magazines at a digital magazine server, each digital magazine including one or more content items for presentation;
    maintain, at the digital magazine server, comments associated with each of at least a set of the digital magazines, comments associated with content items presented by the digital magazine server to users, a comment associated with a content item and with a digital magazine in which the content item was presented when the comment was received;
    receive, from a user, a request for information describing comments associated with a specific content item accessed through a source digital magazine presented to the user via the digital magazine server;
    retrieve a plurality of comments with the specific content item from the maintained comments, one or more of the plurality of comments associated with an additional digital magazine different than the source digital magazine;
    aggregate the retrieved plurality of comments based on characteristics of each of the retrieved plurality of comments to generate information describing global comments associated with the specific content item including comments associated with the source digital magazine and at least one comment associated with at least one additional digital magazine different than the source digital magazine; and
    provide the information describing the global comments associated with the specific content item to a client device for presentation to the user.

8. The computer program product of claim 7, wherein aggregate the retrieved plurality of comments based on characteristics of each of the retrieved plurality of comments comprises:
    filter the plurality of comments to obtain a set of comments satisfying one or more criteria; and
    aggregate the set of comments to generate the information describing the global comments with the specific content item.

9. The computer program product of claim 8, wherein filter the plurality of comments to obtain a set of comments satisfying one or more criteria comprises:

determine a relevance score for each of the plurality of interactions, a relevance score for a comment of the plurality based on a comparison of one or more topics associated with the comment and one or more topics associated with the user; and filter the plurality of interactions to obtain a set of comments having at least a threshold relevance score.

10. The computer program product of claim 8, wherein filter the plurality of comments to obtain a set of comments satisfying one or more criteria comprises:

determine a quality score for each of the plurality of comments, a quality score for a comment of the plurality based on one or more characteristics of the comment of the plurality; and filter the plurality of comments to obtain a set of comments having at least a threshold quality score.

11. The computer program product of claim 10, wherein a characteristic of the comment of the plurality is selected form a group consisting of: a number of comments in a comment thread including the comment of the plurality, a timestamp of the comment of the plurality, a source of the comment of the plurality, a length of the comment of the plurality, a presence of inappropriate content in the comment of the plurality, a connection between a user associated with the comment of the plurality and the user, and any combination thereof.

12. The computer program product of claim 7, wherein aggregate the retrieved plurality of comments based on characteristics of each of the retrieved plurality of comments to generate information describing global comments associated with the specific content item comprises:

organize the retrieved plurality of comments to present comments associated with the source digital magazine before comments associated with one or more additional digital magazines differing from the source digital magazine.

\* \* \* \* \*

UNITED STATES PATENT AND TRADEMARK OFFICE
CERTIFICATE OF CORRECTION

PATENT NO. : 10,489,473 B2
APPLICATION NO. : 15/620790
DATED : November 26, 2019
INVENTOR(S) : Allen et al.

Page 1 of 1

It is certified that error appears in the above-identified patent and that said Letters Patent is hereby corrected as shown below:

In the Claims

Column 21, Claim 1, Line 21: Delete "with with a digital magazine" and insert --with a digital magazine--
Column 22, Claim 5, Line 4: Delete "form" and insert --from--
Column 23, Claim 11, Line 19: Delete "form" and insert --from--

Signed and Sealed this
Twenty-sixth Day of April, 2022

Katherine Kelly Vidal
*Director of the United States Patent and Trademark Office*